United States Patent [19]

Schaub

[11] Patent Number: 5,215,766
[45] Date of Patent: Jun. 1, 1993

[54] PROCESS FOR COVERING THE ENERGY NEEDS OF ANIMALS AND FEED FOR CARRYING IT OUT

[75] Inventor: Werner Schaub, Thunstetten, Switzerland

[73] Assignee: Alifet AG, Butzberg, Switzerland

[21] Appl. No.: 187,980

[22] Filed: Apr. 29, 1988

Related U.S. Application Data

[63] Continuation of Ser. No. 545,187, Oct. 25, 1983, abandoned, and a continuation-in-part of Ser. No. 467,231, Feb. 17, 1983, abandoned, which is a continuation of Ser. No. 247,865, Mar. 26, 1981, abandoned.

[30] Foreign Application Priority Data

Apr. 2, 1980 [CH] Switzerland .......................... 2600/80

[51] Int. Cl.$^5$ .......................... A23D 9/00; A23K 1/00
[52] U.S. Cl. .......................... 426/2; 426/609; 426/623; 426/635
[58] Field of Search ............. 426/2, 609, 623, 635

[56] References Cited

U.S. PATENT DOCUMENTS

| | | | |
|---|---|---|---|
| 1,329,845 | 2/1920 | Overbeck | 426/609 X |
| 2,463,870 | 3/1949 | Hansen | 426/609 X |
| 2,472,663 | 6/1949 | Kleine et al. | 426/609 X |
| 3,011,892 | 12/1961 | Rosenberg | 426/609 X |
| 3,594,176 | 7/1971 | Morris | 426/609 X |
| 3,745,961 | 8/1973 | Ueno et al. | 426/609 X |
| 3,881,629 | 4/1975 | Arenson | 426/609 X |
| 3,925,560 | 12/1975 | Scott et al. | 426/2 |
| 3,959,493 | 5/1976 | Baalsrud et al. | 426/2 |
| 4,042,718 | 8/1977 | Rawlings et al. | 426/609 X |
| 4,216,234 | 8/1980 | Rawlings et al. | 426/2 |

FOREIGN PATENT DOCUMENTS

| | | |
|---|---|---|
| 574196 | 12/1958 | Belgium . |
| 1145903 | 12/1958 | Fed. Rep. of Germany . |
| 1692523 | 8/1966 | Fed. Rep. of Germany . |
| 2209565 | 9/1973 | Fed. Rep. of Germany . |
| 2343432 | 3/1977 | France . |
| 263515 | 8/1965 | Netherlands . |
| 0456010 | 7/1968 | Switzerland . |
| 1165320 | 8/1965 | United Kingdom . |
| 1164462 | 9/1969 | United Kingdom . |

OTHER PUBLICATIONS

Lang & Uzzau, "Les Corps En Pondre: Propierties, Preparation, Utilisations", *Corp Gras En Pondre*, No. 6, Jun. 1975, pp. 327-335.

(List continued on next page.)

Primary Examiner—Joseph Golian
Attorney, Agent, or Firm—Marks & Murase

[57] ABSTRACT

To cover the energy needs of animals, in particular domestic animals, including ruminants, relatively large quantities of fat can be fed in a completely absorbable form without disturbing the animals' digestive processes. The fats are chosen from readily available sources such as lard, tallow, fish oils, and the like, and preferably have the following spectrum of fatty acids:

| | |
|---|---|
| $C_4$–$C_{12}$ | 3–5% |
| $C_{14}$ | 1–2% |
| $C_{16}$ | 20–25% |
| $C_{16-1}$ | 1–3% |
| $C_{18}$ | 20–30% |
| $C_{18-1}$ | 35–50% |
| $C_{18-2}$ | 0–1% |
| $C_{20}$ | 1–2% |

If a selected fat has a melting point below the body temperature of the animal to be fed, the fat is hydrogenated to raise its melting point above the body temperature of the animal and is converted preferably by means of a cold-air crystallization process, into a structure of fine particles of a maximum size of 50 μm. The resulting fat particles can be fed alone, or in feed rations of any kind, with further additives such as mixtures of vitamins and minerals, protein concentrates and starch, but without emulsifiers.

33 Claims, 4 Drawing Sheets

OTHER PUBLICATIONS

Perry, Chemical Engineer's Handbook 3rd Ed., 1950, McGraw-Hill Book Co. Inc.: New York, p. 963.

"Gewinnung und Verarbeitung von Nahrungsfetten", by Dr. J. Baltes, Published 1975, pp. 82, 108 and 327–329.

"Tierische Fette in der Tierernahrung", by W. Hartfiel, published in Fette-Seifen-Anstrichmittel: 1975, pp. 417–420.

"The Value of Animal Fat in Rations For Milk Production", published in Journal of Dairy Science, vol. 39, 1956, pp. 1461–1468.

"Futterungslehre" by H. Jucker, 3rd Ed., 1985, p. 18.

"Fat in Lactation Rations: Review", published in Journal of Dairy Science, vol. 63, No. 1, 1980, pp. 1–12.

"Feeding Protected and Unprotected Tallow to Lactating Cows", Journal of Dairy Science, vol. 61, No. 1, 1978, pp. 49–58.

"Verfahren zum vollautomatischen Herstellen von hochkongentrierten Fettgemischen bis zum reinen Fettgranulat", by G. Grun, published in Fette-Seifen-Anstrichmittel:, 1971, No. 4, pp. 271–273.

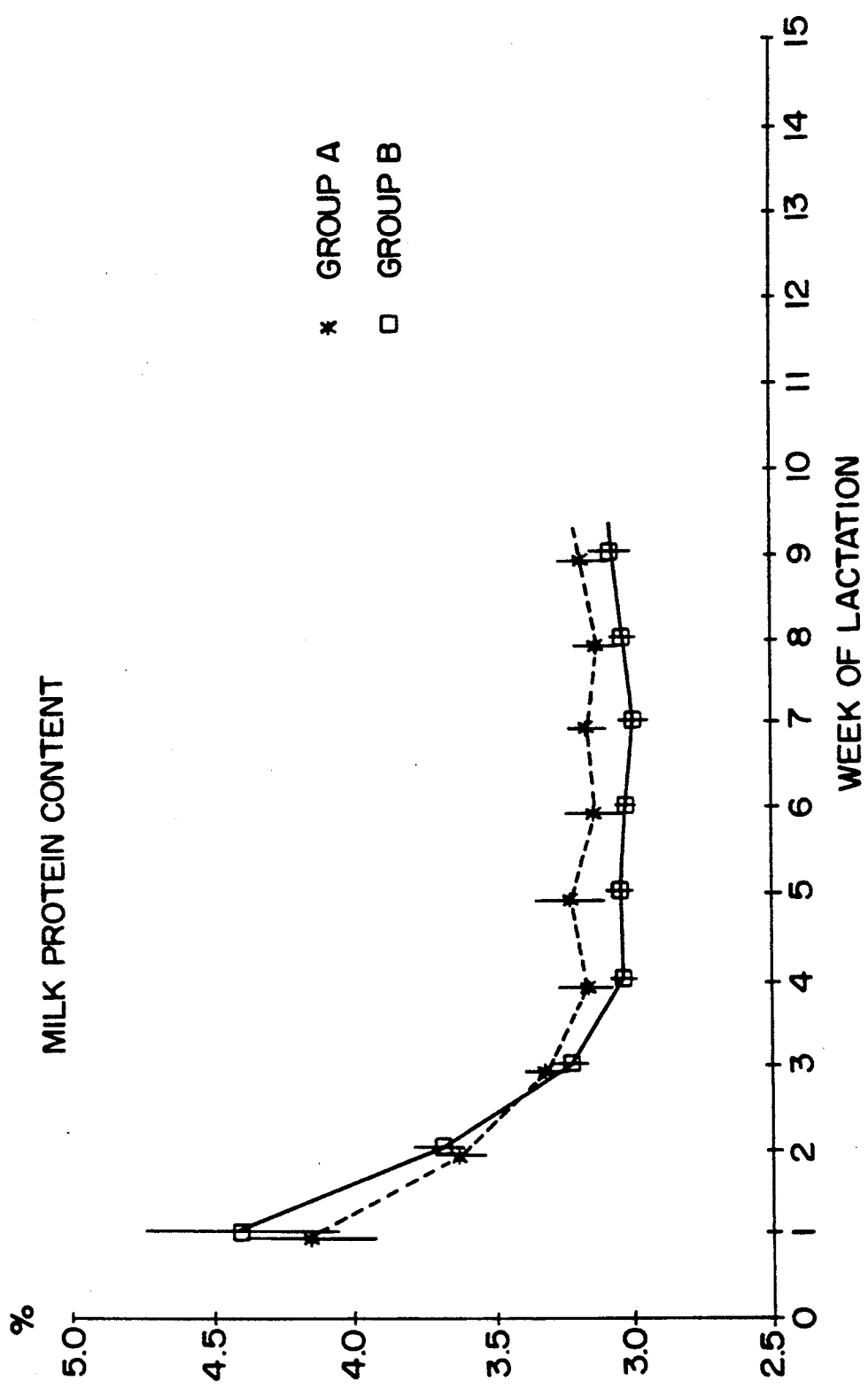

5,215,766

PROCESS FOR COVERING THE ENERGY NEEDS OF ANIMALS AND FEED FOR CARRYING IT OUT

This application is a continuation of application Ser. No. 545,187, filed Oct. 25, 1983, now abandoned, and a continuation-in-part of applicant's copending U.S. patent application, Ser. No. 467,231, filed Feb. 17, 1983, now abandoned, which is a continuation of application Ser. No. 247,865, filed Mar. 26, 1981 now abandoned.

BACKGROUND OF THE INVENTION

1. Field of the Invention

The present invention relates to a method of supplying the energy needs to animals, particularly to domestic animals including ruminants, and the feeds to be used for this method.

2. Description of the Prior Art

It is well known that to cover the energy demands of ruminants and other domestic animals, fat can be used in limited quantities only. Furthermore, the common types of fats, whose melting point lies below that of the body temperature of the animal, can only be fed with the ration in quantities of a maximum of 5%, otherwise the animal's digestive process is considerably disturbed. Another way of feeding fat is in the form of emulsions containing fat particles measuring 10 to 50μm, (Swiss Patentschrift No. 456 010; Lang & Uzzan, "Les Corps Gras en Poudre: Preparation, Proprietes, Utilisations", Corps Gras en Poudre, No. 6, June 1975, pages 327 to 335). Likewise, however, this form of fat supply also causes disorders of the digestive process—in the omasum and especially in the rumen—if considerable quantities are fed.

It is general knowledge that fats which melt at high temperatures, i.e., above about 50° C., suffer in digestibility at a progressively greater rate as the melting point is increased. This has been confirmed by A. Rosenberg in his U.S. Pat. No. 3,011,0892. In order to overcome this difficulty, Rosenberg has suggested the use of fat mixtures of very specific composition including one or more liquid oils that have not been hydrogenated. fat is said to have good digestibility with chicks when fed flakes which may be up to 2 mm in thickness and up to 5 mm in diameter. It was held that the size of such particles is not critical.

SUMMARY OF INVENTION

The purpose of the present invention is to offer the possibility of feeding fats in large quantities, i.e., in excess of about 5%, in a form which does not cause disorders of the digestive process even of ruminants, and which can nevertheless be completely resorbed.

With this method, for example, the much-feared ketosis in dairy cattle during the period of lactation, as well as its after-effects, such as, for example, fertility disorders and low persistence, can be avoided by providing the possibility of a supply energy in conformity with milk production. The solution, by the invention, consists of feeding to the animals fats in powdered or particulate form, wherein the fats have a melting point above the body temperature of the animals and have a particle size measuring 50μm at most. The fats are fed in dry form without any addition of emulsifiers. With this method, it has been found on the one hand, that the above-mentioned disadvantages of fats which cover the food particles with a film of fat in the digestive tract of the animal can be avoided, and on the other hand, that complete resorption of the fats is effected because of the small size of the particles. In particular, the fat particles in the omasum remain unchanged, thus forming neither an emulsion nor a film of fat; they are digested and resorbed in the small intestine. Thus, fat portions exceeding 5% can be added and fed in the ration; rations containing as much as 23% fat having been tested on dairy cows without any drawbacks and with high resorption of the fat. Thus, the method of this invention is contrary to all theories stating that ruminants are unable to digest and support fat in such high quantity.

To prepare the fat particles or high fat feeds of the present invention virtually any animal or vegetable fat or mixture of such fats may be used, so long as the selected fat has a melting point above the body temperature of the animals to be fed, provided that such low-melting fat or oil is first hydrogenated by methods well known in the art to raise the melting point of the fat or oil above the body temperature of the animals to be fed. Thus, the present invention not only provides novel means for the energy needs of animals, but at the same time provides a novel and highly economic way of using surplus fat. In most industrialized countries with high meat consumption, large quantities of surplus fat are produced for which no proper use and recycling has been known. For hygienic reasons very small quantities of such fats are used for human nourishment, and for the reasons set out above, use of such fats for animal feeding was not believed to be suitable. This invention now shows the way for economic use of such surplus products for animal feeding, particularly for feeding dairy cows and beef cattle or the like. The high economy of this invention not only results from the possibility of recycling surplus fat, but since the energy needs of the animals may now largely be covered with cheap fat, expensive feeds, particularly cereals, may be substituted for by fat to a substantial degree.

DESCRIPTION OF THE DRAWINGS

FIG. 4 is a graph comparing the milk protein content versus the week of lactation of cows fed with a fat-free ration (Group A) and cows fed with a high fat ration in accordance with the invention (Group B).

DETAILED DESCRIPTION OF THE INVENTION

Figure 1:
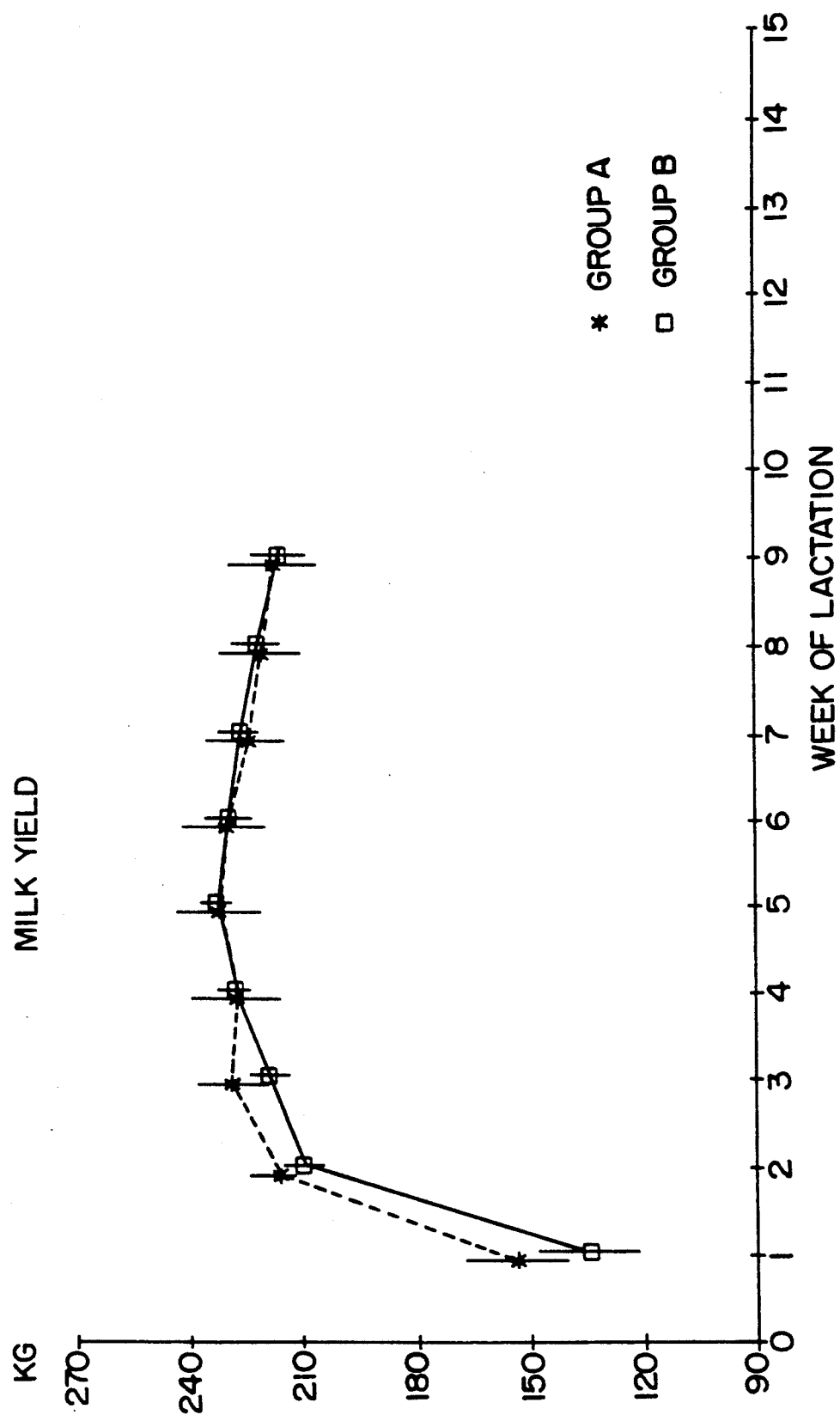
FIG. 1 is a graph comparing the milk yield versus the week of lactation of cows fed with a fat-free ration (Group A) and cows fed with a high fat ration in accordance with the invention (Group B)
Figure 2:
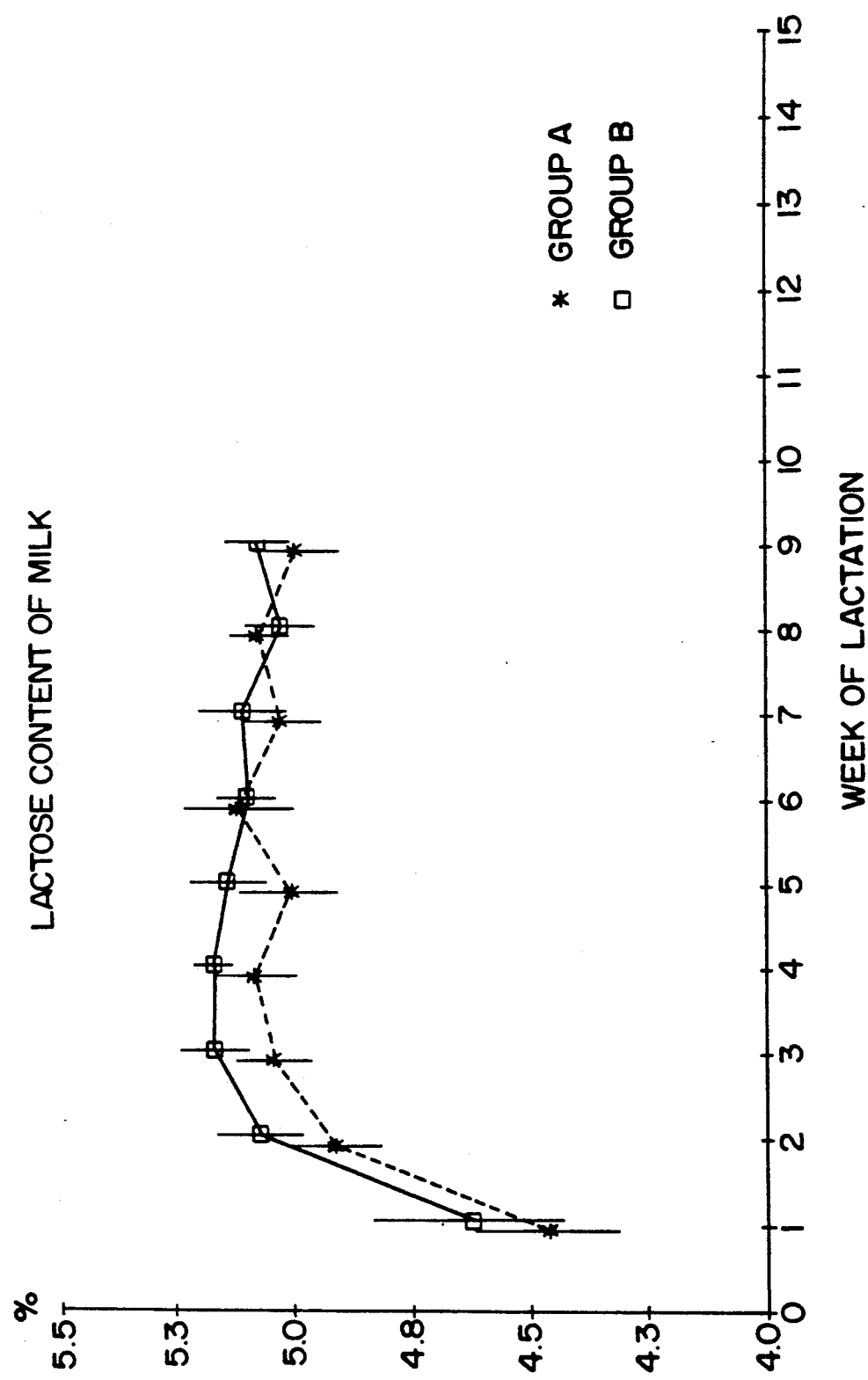
FIG. 2 is a graph comparing the lactose content in the milk produced versus the week of lactation of cows fed with a fat-free ration (Group A) and cows fed with a high fat ration in accordance with the invention Group B)

The method of obtaining the fat powder according to this invention and examples of this feed will first be described.

As set out above, any available fat or oil or mixture thereof may be used. In most industrialized countries animal fats such as lard, tallow, fish oils and the like are available in high quantities. Such fats are removed from the tissue of slaughtered animals, for example, by hot vapors or by solvent extraction techniques which are well known in the art and which are not per se part of the present invention.

The fats, because of their broad ranging sources, may exhibit widely varying melting points. However, only those fats exhibiting a melting point above the body temperature of the animals to be fed are suitable for preparing the powdered fat according to the invention. Accordingly, any fats or oils of low melting point are hydrogenated in a manner well known in the art to raise the melting point of the fat or oil above the body temperature of the animals to be fed. Normally, the fats having a melting point below about 45° C. are hydrogenated to raise their melting point to about 45° C. or higher. The upper limit of the melting point of the fat is not particularly critical and fats having a melting point of 70° C. or more are satisfactory. However, since it becomes increasingly more expensive to raise the melting point of low melting fats or oils to a very high melting point and since it is essential only to raise the melting point enough such that the melting point is above the body temperature of the animals to be fed, the low melting fats or oils generally are hydro-generated only to the extent necessary to raise their melting point to about 45° C.-70° C.;

As indicated above, non-hydrogenated fats of high natural melting point, such as beef fat, may be used without hydrogenating. However, in some cases it may be desirable or at least convenient to hydrogenate even relatively high melting point fats. For example, when the fats to be used are derived from a mixture of low melting fats or oils and relatively higher melting fats, it is often more convenient to hydrogenate the whole mixture than to separate the fats on the basis of their melting points and to then hydrogenate only those fats or oils having a melting point below the body temperature of the animals to be fed. This would in no way effect the utility of the resultant hydrogenated mixture so long as all of the fat components in the hydrogenated mixture melt above the body temperature of the animals to be fed and so long as the particles of the resulting hydrogenated fat powder are below about 50 μm in size.

All steps of separating the fats from the tissues, hydro-genating and treating them otherwise are well known in the art and are not per se a part of this invention. They are extensively described, for example, in "Gewinnung und Verarbeitung von Nahrungsfetten" by J. Baltes, published by P. Parey, Berlin, Hamburg, 1975.

Fats obtained and hydrogenated as set out above generally have the following spectrum of fatty acids:

| | |
|---|---|
| $C_4$–$C_{12}$ | 3–5% |
| $C_{14}$ | 1–2% |
| $C_{16}$ | 20–25% |
| $C_{16-1}$ | 1–3% |
| $C_{18}$ | 20–30% |
| $C_{18-1}$ | 35–50% |
| $C_{18-2}$ | 0–1% |
| $C_{20}$ | 1–2% |

These fats have a iodine value in the order of 35 to 45.

Vegetable fats are prepared similarly. Since vegetable fats differ from animal fats in the composition of fatty acids and also appreciably differ amongst each other, such fats differ from the above spectrum of fatty acids and iodine value, but this is without any negative consequences from a technical or physiological point of view, provided such fats are fed in strict accordance with the conditions of this invention.

The fats obtained as set out above and mixed in any desired quantities are melted and are then treated by a cold-air spray-crystallization process. Methods and apparatus for producing fat powder having a particle size below 50 μm are well the art and are not per se a part of this invention. A method and apparatus of this type is described in Swiss patent 456,010. The fat powder of particles having a size below 50 μm may be used as such as an animal feed or food supplement or it may be blended with other components to form a premixed or concentrated feed or ration, the powdered fat may be used in any amount as desired. However, amounts of at least about 5% should be used to take advantage of the unique characteristics of the fat powder of this invention and amounts of up to about 25% or more of the ration are suitable.

For ease of handling, it is often desirable to form fat concentrates by mixing the fat powder with a carrier which is inert relative to the fat such as powdered calcium carbonate, titanium dioxide, aluminum oxide, or preferably, a starch such as cornstarch, wheat starch or the like. The carrier or mixture or carriers may be added to the fat particles in widely varying amounts, with amounts of carrier ranging from about 5% to about being acceptable. Preferably, the amount of carrier would range from about 5% to about 15% by weight. The carrier may be added to the fat particles while the fat particles are suspended in a near vacuum in a hot state. As is the case for the powdered fat having no carrier, the powdered fat concentrate containing, for example, 10% carrier and 90% fat, may be used as a single component feed or as one component of a combination feed or ration, the portion of fat in the ration may be up to about 25%.

The following high fat feeds or rations may be prepared and used with excellent success:

| I) Mixture with relatively small energy density | |
|---|---|
| fat concentrate according to the invention (90% hydrogenated lard-10% cornstarch) | 10 parts by weight |
| cereal starch | 12 parts by weight |
| maize (corn) | 33 parts by weight |
| wheat | 12 parts by weight |
| soya bean meal, extracted | 14 parts by weight |
| maize gluten | 12 parts by weight |
| mineral-vitamin-concentrate | 7 parts by weight |

The portion of pure fat in this feed is on the order of 9%. The energy contents of 1 kg of this mixture is on the order of 8.2 MJ/NEL or 9.0 MJ/NEW. (MJ=Megajoule, NEL=net energy lactation, NEW=net energy growth.) The mineral-vitamin concentrate is of the type conventionally employed in annual rations and includes minerals such as calcium, phosphorus, sodium, magnesium, iron, zinc, manganese, copper, cobalt, iodine and the like. Similarly, the vitamins included in the concentrate are conventional ration adjuncts consistent with animal nutrition.

| | |
|---|---|
| fat concentrate according to the invention (90% hydrogenated lard-10% cornstarch) | 23 parts by weight |
| soya bean meal, extracted | 68 parts by weight |
| vitamin-mineral-concentrate | 9 parts by weight |

The portion of pure fat in this mixture is on the order The energy contents of 1 kg is on the order of 10.0 or 10.9 MJ/NEW.

According to the quality and quantity of basic feed available, any intermediate portion of fat concentrate according to this invention may be added to the ration.

Mixtures of concentrated feeds which have been energetically improved by the addition of fat concentrate according to this invention exhibit energy densities never achieved in the past. Accordingly, animals can be fed as little as ⅔ their normal ration of concentrated feed without any loss of production. Stated differently, the uniquely high energy densities of rations containing the fat particles in accordance with this invention allow savings of up to ⅓ of the usual quantities of concentrated feed without any loss in productivity of the animals. This is not only of high economic importance in view of a reduction of expenses for the feed, but also in view of the world-wide deficiency of cereals.

This invention will now further be illustrated by the following examples.

EXAMPLE 1

In this example, a group of cows in their first lactation were fed a ration with and without a fat concentrate according to this invention. Beginning in the third week of the lactation period tests were made to ascertain the digestibility of the rations. The cows were fed individually and the test groups (twelve cows each) were selected in accordance with milk quantity, milk composition and weight of the cows during the first and second week of the lactation period. The duration of test was 8 and the test conditions were changed after 4 weeks. The cows were fed with hay ad libitum and concentrated feed of a composition A and B as stated below. The quantities of concentrated feeds were as follows in three rations per day:

| | |
|---|---|
| 2 weeks prior to calve | 2 kg |
| 1st and 2nd week of lactation | 4 kg |
| 3rd to 10th week of lactation | 5 kg |
| (with more than 25 kg of milk | 6 kg) |

The composition of the concentrated feed was as follows for the two test groups A and B:

| | GROUP A % | GROUP B % |
|---|---|---|
| barley (crushed) | 40 | 40 |
| maize (corn) | 30 | 17 |
| soya bean meal, extracted | 27.1 | 30.1 |
| fat according invention (hydrogenated lard) | — | 10 |
| salt | 0.4 | 0.4 |
| calcium carbonate | 1.5 | 1.5 |
| Premix | 0.7 | 0.7 |
| $Cr_2O_3$ | 0.3 | 0.3 |
| calculated nutritive value per kg dry matter MJ/NEL | 7.0 | 8.5 |
| crude protein g | 181 | 181 |

The digestibility of these rations was examined by the indicator method with the following digesting coefficients:

| | GROUP A | GROUP B |
|---|---|---|
| organic substance | 69.8 | 69.7 |
| protein | 58.9 | 60.4 |
| fat | 66.6 | 83.6 |
| crude fibre | 66.7 | 68.7 |
| ash | 45.7 | 43.4 |

These digestion analyses show that the addition of fat according to this invention (in Group B) had no influence on the digestibility of the organic substances and protein, the being substantially the same in both groups. It is seen that for the most important parameter, namely the digestion of crude fiber, a somewhat better digestion has been observed in Group B, this proving that the fat concentrate according to this invention does not cause the well known digestive depression occurring if fat is added to the feed in a usual form. The digestibility of fat according to this invention is even clearly higher.

The absence of any negative effect on the digestibility the essential nutritive components indicates that the fat either is not hydrolyzed or hydrolyzed in very small proportion only in the rumen. This confirms the theory according to which the hydrogenated fat is protected in the rumen in manner similar to the so-called protected fat, where the fat droplets are enveloped in a coating of protein (U.S. Pat. No. 3,925,560). The cross-linkage of the protein molecules prevents the protein coating from being attacked in the rumen, whereby digestion can take place in the rest of the digestive tract. A similar effect is believed to be by the high melting point in a substantially simpler and cheaper way by this invention, whereby it is assumed that the very small size of less than 50 um of the fat particles is important for assuring high digestibility of the fat in the digestive tract following the rumen.

EXAMPLE 2

Based on the positive test results obtained in Example 1 using fat in a quantity of 10%, further experiments were made higher additions of fat. These experiments were made with dairy cows in two groups A and B of nine cows each selected in with the age, milk production and weight. The cows were habituated to the test ration 3 weeks prior to calving. The following rations of concentrated feed were administered until the 9th week of lactation:

| | GROUP A % | GROUP B % |
|---|---|---|
| fat concentrate according to invention (hydrogenated lard) | — | 23 |
| soya bean meal, extracted | 34 | 68.4 |
| barley | 40.7 | — |
| maize (corn) | 20 | — |
| calcium carbonate | 3.3 | 4 |
| salt | 1 | 1.6 |
| Premix * | 1 | 1 |
| calcium phosphate | — | 2 |
| calculated nutritive value per kg dry matter MJ/NEL | 7.5 | 10.5 |
| calcium protein (gr.) | 235 | 315 |

* containing the minerals magnesia, manganese, copper, zinc, cobalt, iodine, selenium and the vitamins A, $D_3$, E and cereal middlings as carrier.

The basic feed for both groups was used until the 9th week of lactation:

| | |
|---|---|
| maize silage | 6.6 MJ NEL/kg |
| hay | 5.2 MJ NEL/kg |

-continued

The feeds were offered as follows:

| End of the dry period: | maize silage | ad libitum |
| | hay | 6 kg |
| | concentrated feed according to above tables | |
| | A: up to 3 kg | |
| | B: up to 2 kg | |
| 1st to 9th week of lactation: | basic fodder as above | |
| | concentrated feed according to above tables | |
| | A: up to 7.5 kg | |
| | B: up to 5 kg | |

With these rations the animals in both groups A and B obtained the same quantities of energy (MJ NEL) and crude protein (gr).

The following parameters were tested:

| milk production | |
| consumption of basic fodder | |
| composition: | lactose content |
| | fatty acids of the milk fat |
| | protein content |
| | glucose |

The milk quantity in both groups was substantially the same in spite of the reduced administration of concentrated feed in group B. (see Table 1 and FIG. 1)

TABLE 1

Milk Yield (kg) - During Numbered Week of Lactation (LW)

| Animal Number | Group | 1LW | 2LW | 3LW | 4LW | 5LW | 6LW | 7LW | 8LW | 9LW |
|---|---|---|---|---|---|---|---|---|---|---|
| 1 | A | 153.0 | 217.8 | 213.0 | 204.9 | 204.7 | 213.2 | 218.8 | 211.6 | 209.9 |
| 2 | A | 180.5 | 216.1 | 232.2 | 232.0 | 219.5 | 208.3 | 215.7 | 207.0 | 199.9 |
| 3 | A | 225.9 | 248.7 | 259.0 | 262.2 | 255.2 | 240.5 | 227.6 | 225.3 | 227.4 |
| 4 | A | 74.5 | 222.5 | 239.4 | 249.8 | 261.9 | 261.0 | 252.1 | 253.4 | 267.9 |
| 5 | A | 129.1 | 194.0 | 193.3 | 183.0 | 178.7 | 173.9 | 170.0 | 166.9 | 157.7 |
| 6 | A | 134.6 | 250.1 | 262.5 | 290.6 | 277.2 | 281.5 | 274.6 | 268.7 | 263.2 |
| 7 | A | 148.0 | 208.3 | 220.4 | 205.9 | 207.0 | 202.0 | 199.7 | 199.0 | 195.9 |
| 8 | A | 166.2 | 204.9 | 237.9 | 230.0 | 252.6 | 260.1 | 252.0 | 249.9 | 232.7 |
| 9 | A | 169.5 | 174.3 | 205.3 | 191.0 | 230.7 | 232.9 | 211.6 | 206.1 | 202.6 |
| 10 | B | 146.9 | 206.0 | 195.9 | 216.6 | 223.3 | 228.9 | 225.6 | 203.7 | 199.8 |
| 11 | B | 152.0 | 201.5 | 203.3 | 216.0 | 219.9 | 201.6 | 222.1 | 219.1 | 205.0 |
| 12 | B | 113.0 | 212.5 | 234.2 | 241.5 | 235.4 | 245.7 | 242.2 | 245.7 | 243.1 |
| 13 | B | 173.2 | 239.8 | 248.8 | 243.8 | 242.7 | 227.5 | 204.1 | 209.8 | 201.4 |
| 14 | B | 177.0 | 210.2 | 223.3 | 230.5 | 236.2 | 232.1 | 225.6 | 214.9 | 214.2 |
| 15 | B | 114.0 | 206.4 | 215.2 | 223.6 | 226.6 | 210.3 | 216.4 | 208.7 | 206.4 |
| 16 | B | 176.4 | 208.4 | 224.0 | 232.9 | 254.9 | 261.4 | 246.7 | 259.9 | 260.0 |
| 17 | B | 77.6 | 184.3 | 204.5 | 210.6 | 217.4 | 215.4 | 209.5 | 204.7 | 197.4 |
| 18 | B | 81.8 | 218.1 | 219.7 | 239.2 | 239.3 | 245.1 | 247.8 | 231.0 | 215.4 |

No substantial difference between groups A and B was observed regarding the lactose content. (see Table 2, FIG. 1)

TABLE 2

Lactose Content of Milk (%) - During Numbered Week of Lactation (LW)

| Animal Number | Group | 1LW | 2LW | 3LW | 4LW | 5LW | 6LW | 7LW | 8LW | 9LW |
|---|---|---|---|---|---|---|---|---|---|---|
| 1 | A | 3.9 | 5.3 | 5.3 | 5.4 | 5.1 | 5.1 | 5.2 | 5.1 | 5.1 |
| 2 | A | 4.2 | 4.5 | 4.5 | 4.7 | 4.3 | 4.7 | 4.4 | 4.8 | 4.4 |
| 3 | A | 4.9 | 5.3 | 5.3 | 5.2 | 5.2 | 5.5 | 5.0 | 5.3 | 5.3 |
| 4 | A | 4.9 | 4.9 | 5.2 | 5.4 | 5.2 | 5.3 | 5.1 | 5.3 | 5.2 |
| 5 | A | 4.5 | 5.1 | 5.1 | 5.1 | 5.1 | 4.9 | 5.2 | 5.0 | 5.1 |
| 6 | A | — | 4.8 | 5.0 | 4.9 | 5.2 | 4.9 | 5.1 | 5.1 | 5.0 |
| 7 | A | 4.0 | 4.9 | 5.0 | 5.0 | 4.9 | 5.1 | 5.0 | 4.9 | 5.0 |
| 8 | A | 4.3 | 4.6 | 4.9 | 4.8 | 4.8 | 4.9 | 5.0 | 5.0 | 4.8 |
| 9 | A | 5.0 | 4.8 | 5.1 | 5.2 | 5.3 | 5.7 | 5.3 | 5.1 | 5.1 |
| 10 | B | 4.0 | 5.1 | 5.3 | 5.0 | 5.1 | 5.2 | 5.2 | 4.9 | 5.1 |
| 11 | B | 5.0 | 5.2 | 5.1 | 5.1 | 5.0 | 5.1 | 5.2 | 5.1 | 5.3 |
| 12 | B | — | 4.9 | 5.3 | 5.2 | 5.5 | 5.1 | 5.4 | 5.2 | 5.1 |
| 13 | B | 3.8 | 4.7 | 4.7 | 5.1 | 4.7 | 4.7 | 4.5 | 4.5 | 4.7 |
| 14 | B | 4.6 | 5.1 | 5.1 | 5.2 | 5.2 | 5.3 | 5.2 | 5.1 | 5.3 |
| 15 | B | — | 4.7 | 5.3 | 5.3 | 5.4 | 5.1 | 5.3 | 5.1 | 5.1 |
| 16 | B | 4.9 | 5.4 | 5.4 | 5.3 | 5.1 | 5.3 | 5.2 | 5.2 | 5.1 |
| 17 | B | 5.0 | 5.1 | 5.2 | 5.3 | 5.2 | 5.0 | 5.0 | 5.1 | 4.9 |
| 18 | B | 5.1 | 5.4 | 5.1 | 5.0 | 5.1 | 5.1 | 5.0 | 5.1 | 5.1 |

The spectrum of fatty acids in the milk fat of groups A and B was observed. In the milk of group B the fatty acids of short or middle structure were reduced by about 10%, but the proportion of unsaturated fatty acids $C_{18-1}$ and $C_{18-2}$, particularly of the oleic acid $C_{18-1}$, was increased by about 11%. This would result in a butter made of the milk of group B of sorter consistency. (see Tables 3 and 4)

TABLE 3

Fatty Acids in the Milk Fat of Group A (%) - During Number Week of Lactation (LW)

| Fatty Acids* | 1LW | 2LW | 3LW | 4LW | 5LW | 6LW | 7LW | 9LW |
|---|---|---|---|---|---|---|---|---|
| C 4:0 | 2.8 | 3.0 | 3.0 | 3.0 | 2.9 | 2.9 | 2.6 | 2.7 |
| C 6:0 | 1.8 | 1.0 | 2.2 | 2.3 | 2.2 | 2.2 | 2.1 | 2.1 |
| C 8:0 | 1.1 | 1.2 | 1.4 | 1.5 | 1.4 | 1.5 | 1.4 | 1.4 |
| C 10:0 | 2.6 | 2.6 | 2.6 | 3.4 | 3.3 | 3.4 | 3.5 | 3.5 |
| C 11:0 | 0.1 | 0.2 | 0.2 | 0.3 | 0.3 | 0.3 | 0.3 | 0.3 |
| C 12:0 | 3.2 | 2.9 | 3.4 | 3.9 | 3.8 | 3.9 | 4.1 | 4.1 |
| C 14:br | 0.1 | 0.1 | 0.2 | 0.1 | 0.2 | 0.1 | 0.2 | 0.2 |
| C 14:0 | 11.8 | 10.0 | 11.0 | 11.9 | 12.3 | 12.5 | 12.9 | 13.0 |

TABLE 3-continued

Fatty Acids in the Milk Fat of Group A (%) - During Number Week of Lactation (LW)

| Fatty Acids* | 1LW | 2LW | 3LW | 4LW | 5LW | 6LW | 7LW | 9LW |
|---|---|---|---|---|---|---|---|---|
| C 14:1/C15 | 1.2 | 1.1 | 1.3 | 1.4 | 1.6 | 1.6 | 1.7 | 1.8 |
| C 15:1 | 0.8 | 0.9 | 1.0 | 1.1 | 1.2 | 1.2 | 1.4 | 1.3 |
| C 16:br | 0.3 | 0.3 | 0.3 | 0.3 | 0.4 | 0.4 | 0.4 | 0.4 |
| C 16:0 | 33.3 | 28.8 | 30.2 | 31.7 | 32.8 | 33.9 | 35.1 | 34.8 |
| C 16:1 | 3.0 | 2.8 | 2.8 | 2.6 | 2.6 | 2.5 | 2.5 | 2.4 |
| C 17:0 | 0.9 | 1.0 | 0.9 | 0.9 | 0.9 | 0.9 | 0.9 | 0.9 |
| C 17:1 | 0.5 | 0.5 | 0.5 | 0.4 | 0.4 | 0.4 | 0.4 | 0.4 |
| C 18:0 | 9.9 | 12.4 | 10.3 | 9.6 | 8.9 | 8.4 | 8.1 | 8.2 |
| C 18:1 | 22.2 | 26.2 | 24.3 | 22.0 | 21.3 | 20.3 | 19.3 | 19.0 |
| C 18:2 | 2.4 | 2.5 | 2.6 | 2.4 | 2.3 | 2.3 | 2.2 | 2.2 |
| C 18:3 | 1.5 | 1.5 | 1.4 | 1.4 | 1.3 | 1.3 | 1.3 | 1.3 |
| C 20:0 | 0.2 | 0.1 | 0.2 | 0.2 | 0.1 | 0.1 | 0.1 | 0.1 |

*The fatty acids are shown as containing a given number of carbon atoms and double bonds. The number of carbon atoms is stated after "C" and the number of double bonds is stated after ":". The "br" following ":" for C14 and C16 indicates that the fatty acids are branched.

TABLE 4

Fatty Acids in the Milk Fat of Group B (%) - During Number Week of Lactation (LW)

| Fatty Acids | 1LW | 2LW | 3LW | 4LW | 5LW | 6LW | 7LW | 9LW |
|---|---|---|---|---|---|---|---|---|
| C 4:0 | 2.5 | 2.9 | 2.7 | 2.7 | 2.4 | 2.3 | 2.2 | 2.1 |
| C 6:0 | 1.5 | 1.8 | 1.5 | 1.5 | 1.4 | 1.4 | 1.3 | 1.2 |
| C 8:0 | 0.9 | 1.0 | 0.8 | 0.8 | 0.8 | 0.7 | 0.7 | 0.7 |
| C 10:0 | 1.7 | 1.8 | 1.5 | 1.5 | 1.5 | 1.5 | 1.5 | 1.4 |
| C 11:0 | 0.1 | 0.1 | 0.1 | 0.2 | 0.2 | 0.2 | 0.2 | 0.2 |
| C 12:0 | 2.2 | 2.0 | 1.7 | 1.8 | 1.8 | 1.8 | 1.5 | 1.7 |
| C 14:br | 0.2 | 0.1 | 0.1 | 0.1 | 0.1 | 0.1 | 0.1 | 0.1 |
| C 14:0 | 9.1 | 8.1 | 7.4 | 7.5 | 7.7 | 7.8 | 7.9 | 7.7 |
| C 14:1/C15 | 0.9 | 0.9 | 1.0 | 1.1 | 1.2 | 1.3 | 1.3 | 1.4 |
| C 15:1 | 0.8 | 0.8 | 0.8 | 0.7 | 0.8 | 0.8 | 0.8 | 0.8 |
| C 16:br | 0.2 | 0.3 | 0.3 | 0.3 | 0.3 | 0.3 | 0.3 | 0.3 |
| C 16:0 | 29.5 | 27.1 | 27.5 | 27.8 | 28.4 | 28.1 | 28.6 | 27.9 |
| C 16:1 | 2.8 | 2.7 | 2.9 | 2.9 | 3.0 | 3.0 | 3.1 | 3.2 |
| C 17:0 | 0.9 | 0.9 | 0.8 | 0.8 | 0.8 | 0.8 | 0.8 | 0.7 |
| C 17:1 | 0.5 | 0.5 | 0.4 | 0.4 | 0.4 | 0.4 | 0.4 | 0.4 |
| C 18:0 | 13.0 | 13.8 | 13.4 | 13.3 | 11.6 | 11.4 | 11.0 | 10.3 |
| C 18:1 | 28.8 | 32.0 | 32.9 | 33.5 | 33.6 | 34.2 | 33.6 | 35.0 |
| C 18:2 | 2.3 | 1.9 | 2.0 | 1.9 | 1.9 | 1.9 | 1.9 | 1.8 |
| C 18:3 | 1.9 | 2.0 | 2.0 | 2.1 | 2.1 | 2.1 | 2.2 | 2.5 |
| C 20:0 | 0.1 | 0.1 | 0.2 | 0.2 | 0.1 | 0.2 | 0.2 | 0.2 |

*The fatty acids are shown as in Table 3.

Figure 3:
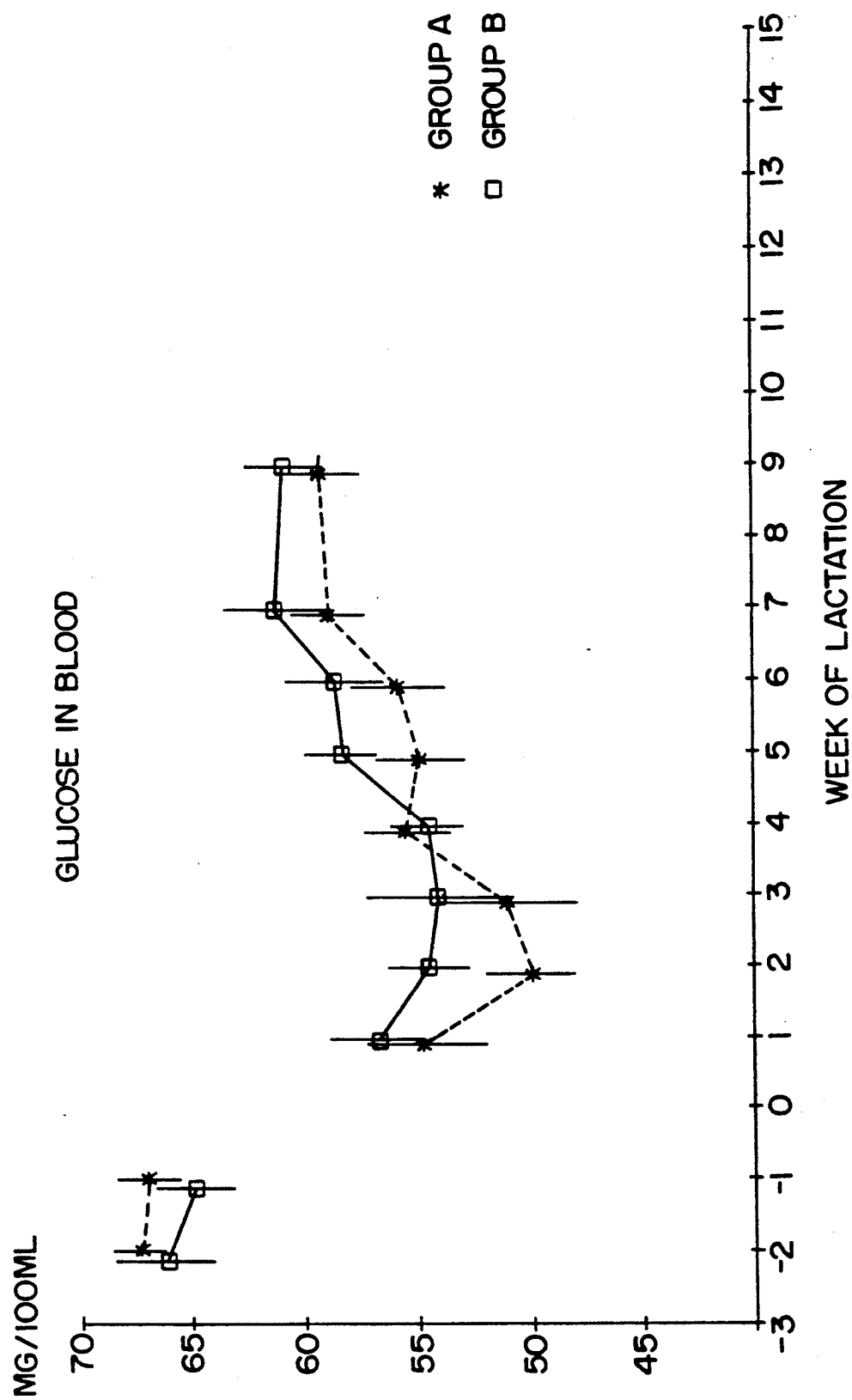
FIG. 3 is a graph comparing the blood glucose level versus the week of lactation of cows fed with a fat-free ration (Group A) and cows fed with a high fat ration in accordance with the invention (Group B)

The glucose values in the blood of the cows of group A decreased more rapidly than those of Group B, thus showing that the cows of group B were energetically better supplied. It may be assumed that this efficiently reduces the danger of acetonemy (ketosis). (see Table 5, FIG. 3) The milk protein content shows no significant difference (see Table 6, FIG. 4)

TABLE 5

Glucose in Blood mg/100 ml - During Numbered Week of Lactation (LW)

| Animal Number | Group | −2 Weeks Before Calving | −1 Week Before Calving | 1LW | 2LW | 3LW | 4LW | 5LW | 6LW | 7LW | 9LW |
|---|---|---|---|---|---|---|---|---|---|---|---|
| 1 | A | 73.9 | 73.9 | 61.5 | 54.1 | 65.3 | 60.7 | 63.5 | 54.4 | 64.1 | 61.9 |
| 2 | A | 64.7 | 62.4 | 59.5 | 58.7 | 45.2 | 51.9 | 49.2 | 63.4 | 64.3 | 57.5 |
| 3 | A | 66.1 | 69.1 | — | 41.7 | 45.8 | 53.9 | 51.8 | 57.4 | 53.6 | 64.8 |
| 4 | A | — | — | 52.3 | 53.5 | 56.1 | 58.8 | 59.1 | 55.0 | 60.5 | 58.5 |
| 5 | A | 67.2 | 65.8 | 62.0 | 50.9 | 61.1 | 57.5 | 54.8 | 51.6 | 61.8 | 51.1 |
| 6 | A | 70.2 | 62.8 | 46.7 | 40.8 | 35.9 | 45.1 | 44.2 | 50.4 | 54.5 | 54.4 |
| 7 | A | 66.9 | 65.1 | 52.7 | 46.3 | 52.3 | 55.6 | 56.6 | 58.9 | 56.8 | 57.4 |
| 8 | A | 65.5 | 68.3 | 42.8 | 51.7 | 53.3 | 51.8 | 55.6 | 45.7 | 52.1 | 59.8 |
| 9 | A | 63.4 | 68.3 | 59.8 | 51.4 | 43.7 | 63.0 | 58.2 | 64.9 | 61.5 | 67.2 |
| 10 | B | 67.7 | 69.4 | 56.3 | 62.6 | 50.0 | 54.7 | 60.0 | 58.7 | 68.9 | 62.0 |
| 11 | B | 61.1 | 60.1 | 59.1 | 56.2 | 53.6 | 54.0 | 60.4 | 61.6 | 68.2 | 62.0 |
| 12 | B | 78.2 | 64.9 | 53.4 | 56.3 | 54.0 | 54.1 | 62.9 | 52.5 | 58.0 | 57.9 |
| 13 | B | 64.8 | 60.3 | 57.5 | 55.8 | 59.3 | 59.9 | 61.2 | 62.4 | 62.5 | 63.9 |
| 14 | B | 64.2 | 62.3 | 62.1 | 54.5 | 68.3 | 61.7 | 56.9 | 58.0 | 66.6 | 61.0 |
| 15 | B | 72.0 | 72.8 | 46.0 | 43.8 | 39.2 | 48.9 | 56.8 | 50.0 | 60.6 | 60.2 |
| 16 | B | 59.6 | — | 64.9 | 52.2 | 44.1 | 50.7 | 54.8 | 58.9 | 50.4 | 56.1 |
| 17 | B | 58.5 | 59.7 | 50.4 | 58.7 | 51.6 | 48.2 | 47.9 | 53.9 | 52.5 | 52.2 |
| 18 | B | 69.9 | 69.1 | 60.6 | 49.9 | 65.8 | 57.7 | 62.9 | 70.8 | 62.2 | 68.1 |

TABLE 6

Milk Protein Content (%) - During Numbered Week of Lactation (LW)

| Animal Number | Group | 1LW | 2LW | 3LW | 4LW | 5LW | 6LW | 7LW | 8LW | 9LW |
|---|---|---|---|---|---|---|---|---|---|---|
| 1 | A | 3.6 | 3.5 | 3.1 | 3.2 | 3.2 | 3.1 | 3.2 | 3.1 | 3.3 |
| 2 | A | 3.9 | 3.4 | 3.1 | 3.2 | 2.9 | 2.7 | 3.0 | 3.0 | 3.0 |
| 3 | A | 3.9 | 3.4 | 3.5 | 3.1 | 3.1 | 3.2 | 3.2 | 3.3 | 3.3 |
| 4 | A | — | 3.8 | 3.6 | 3.1 | 3.1 | 3.2 | 3.1 | 2.9 | 2.9 |
| 5 | A | 4.0 | 4.2 | 3.1 | 3.7 | 3.7 | 3.7 | 3.4 | 3.6 | 3.5 |
| 6 | A | 3.7 | 3.5 | 3.3 | 2.9 | 3.0 | 2.8 | 2.9 | 2.8 | 2.9 |
| 7 | A | 5.8 | 3.8 | 3.4 | 3.3 | 3.9 | 3.3 | 3.3 | 3.2 | 3.3 |
| 8 | A | 4.2 | 3.7 | 3.1 | 3.1 | 2.9 | 2.9 | 3.1 | 2.9 | 3.1 |
| 9 | A | 4.3 | 3.3 | 3.6 | 2.8 | 3.2 | 3.3 | 3.2 | 3.3 | 3.3 |
| 10 | B | 6.9 | 4.0 | 3.5 | 3.1 | 3.2 | 3.1 | 3.2 | 3.3 | 3.2 |
| 11 | B | 3.8 | 3.5 | 3.1 | 3.0 | 2.8 | 2.9 | 2.8 | 3.0 | 3.1 |
| 12 | B | 3.9 | 3.8 | 3.3 | 3.1 | 3.1 | 3.0 | 3.0 | 3.0 | 2.9 |
| 13 | B | 4.5 | 3.3 | 3.1 | 3.1 | 3.0 | 3.1 | 3.1 | 3.1 | 3.3 |
| 14 | B | 4.2 | 3.3 | 2.9 | 2.9 | 3.1 | 3.1 | 2.9 | 3.0 | 3.0 |
| 15 | B | 4.0 | 3.8 | 3.2 | 2.9 | 2.9 | 2.9 | 2.8 | 2.9 | 2.8 |
| 16 | B | 4.3 | 3.5 | 3.2 | 2.9 | 3.0 | 3.0 | 3.1 | 3.0 | 3.0 |
| 17 | B | 4.0 | 3.9 | 3.3 | 3.2 | 3.2 | 3.0 | 3.0 | 2.9 | 2.9 |

TABLE 6-continued

| | | Milk Protein Content (%) - During Numbered Week of Lactation (LW) | | | | | | | | |
|---|---|---|---|---|---|---|---|---|---|---|
| Animal Number | Group | 1LW | 2LW | 3LW | 4LW | 5LW | 6LW | 7LW | 8LW | 9LW |
| 18 | B | 4.1 | 4.0 | 3.4 | 3.1 | 3.1 | 3.1 | 3.0 | 3.1 | 3.4 |

The following Table 7 shows the consumption of basic fodder. It is seen that the animals of group B consumed about 4.2 kg per day more than the animals in group A, thus showing that due to the reduced quantity of concentrated feed the animals consume higher quantities of the cheap fodder offered ad libitum. Thereby feeding becomes much more economic. The difference is also of importance from the point of view of nutrition physiology because the increased consumption of basic fodder is in agreement with the needs of ruminants (higher proportion of structurized crude fiber), whereby proper functions of the rumen are ensured.

TABLE 7

| Consumption of maize silage per day | | | | | | | | | | |
|---|---|---|---|---|---|---|---|---|---|---|
| Week of Lactation | 1 | 2 | 3 | 4 | 5 | 6 | 7 | 8 | 9 | Average |
| Group A kg/day | 18.5 | 19.5 | 21.0 | 21.5 | 22.5 | 23.5 | 24.0 | 25.0 | 25.0 | 22.3 |
| Group B kg/day | 20.0 | 24.0 | 25.0 | 28.0 | 28.5 | 28.5 | 28.0 | 28.0 | 28.0 | 26.5 |

Further experiments were made for testing the feeding according to this invention for the fattening of beef. Results were quite positive. In many cases it was found advisable to use more grass silage than maize silage for the following reasons. In climatic boundary zones the yield of meadows is more reliable than the yield of maize. Heavy soils do not support monocultures of maize for years without the soil structure being destroyed, this resulting in steadily decreasing yield. With meadows in the rotation of crops it is possible to maintain and regenerate the soil structure. It is of particular interest to use areas located on a slope for beef fattening. However, since grass silage is rich in protein but poor in energy, high quantities of cereal have to be used for equilibration of the feed. However, this has a negative influence on the rumen activity where the low pH-value results in inactivation of the cellulases.

Under these circumstances, it is more promising to use fat having no detrimental effect in the rumen. Due to the energy density obtained with the fat used in accordance with this invention in a concentrated feed, the amount of feed to be used may even be reduced substantially. The economic consequences are very favorable as illustrated by the following Table 8:

TABLE 8

| | conventional concentrated feed | conventional feed with fat added according to invention |
|---|---|---|
| energy per kg of feed concentrate | 7.4 MJ NEW | 9 MJ NEW |
| test period | Jan. 8 to March 13, 1981 | March 13 to June 11, 1981 |
| number of animals | 63 | 67 |
| weight of animals | 206 kg | 204 kg |
| growth per animal and day | 1.205 kg | 1.167 kg |
| concentrate ration per day | 2.920 kg | 1.788 kg |
| concentrate per kg of growth | 2.628 kg | 1.582 kg |
| cost of feed per kg of growth | 2.33 Swiss frs. | 1.43 Swiss frs. |

TABLE 8-continued

| | conventional concentrated feed | conventional feed with fat added according to invention |
|---|---|---|
| growth | | |

The highly economic interest of the feeding method of this invention is clearly demonstrated. Besides the reduction of the quantity of concentrated feed ration by over 40% and the reduction of expenses by nearly 40%, surplus products may be used instead of cereals which should be preserved for human needs. Experiments have shown that the quality of the meat of the animals fattened with a concentrate containing fat according to invention was excellent as illustrated by the following Table 9:

TABLE 9

| Criterion | Maximum marks | Average mark of the group |
|---|---|---|
| 1. general suitability | 10 | 9.7 |
| 2. age | 10 | 10 |
| 3. meatiness | 10 | 8.6 |
| 4. consistency | 5 | 5 |
| 5. adiposity | 10 | 10 |
| 6. quality of fat | 5 | 5 |

Where the maximum mark was not reached, this was ascribed to the genetic qualities of the animals and not to the feed. A economy is achieved in this case due to the low cost for concentrated feed and the high price for the meat having quality.

It is to be understood that the above examples and the above-described illustrative embodiments in no way limit the scope of this invention and are intended merely as illustrations of the manner in which the present invention may be practiced. It should be obvious to one skilled in the art that the present invention is in no way limited to the exampled high fat feed rations and that numerous modifications within the spirit and scope of this invention are contemplated.

What is claimed is:

1. A method of supplying a fat containing ratio to animals, including ruminants and other farm animals, comprising the steps of:
   a) selecting at least one available fat having nutritional value to the animal to be fed, said fat being selected from the group consisting of fats having all fat components with a melting point higher than the body temperature of the animal to be fed, fats having fat components with a melting point lower than the body temperature of the animal to be fed, and mixtures thereof;

b) hydrogenating any fat selected in step a) which has fat components with a melting point lower than the body temperature of the animal to be fed to raise the melting point of all fat components of the hydrogenated fat above the body temperature of the animal to be fed;

c) forming, essentially without emulsifiers, a powder of fat particles having a maximum size of about 50 μm exclusively from fat having all fat components with a melting point higher than the body temperature of the animal to b fed, said fat having been selected in step a) and including any fat hydrogenated in step b); and d) feeding said powder of fat particles in dry form, essentially without any emulsifier, to an the animal.

2. A method according to claim 1, wherein said powder of fat particles is fed to an animal in the form a fat-containing ration containing fat in an amount in excess of about 5%.

3. The method of claim 1, wherein at least a portion of the selected fat is hydrogenated prior to being fed to an animal.

4. The method of claim 2, wherein at least a portion of the selected fat is hydrogenated prior to being fed to an animal.

5. The method of claim 1, wherein the fat selected in step a) is selected from fats having the following spectrum of fatty acids:

| | |
|---|---|
| $C_4$-$C_{12}$ | 3-5% |
| $C_{14}$ | 1-2% |
| $C_{16}$ | 20-25% |
| $C_{16-1}$ | 1-3% |
| $C_{18}$ | 20-30% |
| $C_{18-1}$ | 35-50% |
| $C_{18-2}$ | 0-1% |
| $C_{20}$ | 1-2% |

6. The method of claim 5, wherein at least a portion of the selected fat is hydrogenated prior to being fed to an animal.

7. The method of claim 1, wherein the fat selected in step a) is selected from tallow, lard, fish oils, vegetable oils and mixtures thereof.

8. The method of claim 7, wherein at least a portion of the selected fat is hydrogenated prior to being fed to an animal.

9. The method of claim 4, wherein the fat which is hydrogenated in step b) comprises only fat components having a melting point lower than the body temperature of the animal to be fed.

10. The method of claim 4, wherein the fat hydrogenated in step b) comprises a mixture of fat components having a melting point lower than the body temperature of the animal to be fed and fats having a melting point higher than the body temperature of the animal to be fed.

11. The method of claim 1, wherein said powder of fat particles is fed to an animal in the form of a fat-containing ration containing up to about 125% fat.

12. A method of supplying a fat-containing ration for lactating ruminants, comprising the steps of:
selecting a choice of available fats;
hydrogenating any fat selected which has a melting point below the body temperature of the ruminants to be fed to raise the melting point of the fat above said body temperature to ensure that all fats fed to the ruminants have a melting point above said body temperature;
producing a powder of fat particles having a maximjum size of 50 μm and a melting point above said body temperature; and
feeding said powder of fat particles in dry form, essentially without emulsifiers to the ruminants for allowing (10 passage of the fat particles through the rumen of said ruminants essentially without change and thus without effecting digestion in the rumen, and (2) resorption of the fat particles in the digestive tract of said ruminants following the rumen.

13. An animal feed for ruminants containing more than about 5% fat in the form of particles having a size smaller than about 50 μm, all fat components of said fat having a melting point above the body temperature of the ruminants to be fed, the feed being essentially free of emulsifying agents.

14. The animal feed according to claim 13, containing more than about 15% fat.

15. The animal feed according to claim 13, containing hydrogenated fat.

16. The animal feed according to claim 14, containing hydrogenated fat.

17. The animal feed according to claim 13, containing mixtures of minerals, vitamins, starch and protein concentrates in the form of additives.

18. The animal feed according to claim 17, containing in the range of about 5% fat to about 25% fat.

19. The animal feed according to claim 14, containing a mixture of hydrogenated fat and non-hydrogenated fat.

20. A concentrated feed for lactating dairy cattle containing about 10 parts by weight of a fat powder concentrate having a particles size less than about 50 μm, all fat components of said fat powder having a melting point above the body temperature of the cattle to be fed, and essentially free of emulsifiers and admixed with:

| | |
|---|---|
| cereal starch | about 12 parts by weight; |
| maize | about 33 parts by weight; |
| wheat | about 12 parts by weight; |
| soya | about 14 parts by weight; |
| gluten of maize | about 12 parts by weight; |
| mineral-vitamin-concentrate | about 7 parts by weight; | said fat powder concentrate comprising about 90% fat and about 10% starch carrier.

21. The concentrated feed according to claim 20, wherein the fat comprises hydrogenated lard.

22. A concentrated, high energy density feed for lactating dairy cattle, containing about 23 parts by weight of a fat powder concentrate having a particle size not exceeding 50 μm, all fat components of said fat powder having a melting point above the body temperature of the cattle to be fed, and essentially free of any emulsifier, said fat powder concentrate being admixed with about 68 parts by weight of soya and about 9 parts by weight of a vitamin-mineral-concentrate, and wherein said fat powder concentrate comprises about 90% fat and about 10% starch carrier.

23. An edible fat powder concentrate for ruminants comprising from about 5% of about 95% of an inert carrier, and from about 95% to about 5% of a fat having all fat components with a melting point between about 45° C. and 70° C., said fat powder concentrate having a maximum particle size of about 50 μm and being essentially free of emulsifiers.

24. The edible fat powder concentrate according to claim 23, comprising from about 5% to about 15% inert carrier and from about 95% to about 85% fat, said inert carrier being selected from the group consisting of starch, calcium carbonate, titanium dioxide, alumina or mixtures thereof.

25. The edible fat powder concentrate according to claim 24, comprising about 90% fat and about 10% of a starch carrier.

26. The edible fat powder concentrate according to claim 23, comprising a hydrogenated fat.

27. The edible fat powder concentrate according to claim 23, comprising a mixture of hydrogenated fat and non-hydrogenated fat.

28. A method of preparing a fat-containing ration for ruminants comprising the steps of:
   a) selecting at least one available fat having nutritional value to the ruminant to be fed, said fat being selected from the group comprising of fats having all fat components with a melting point higher than the body temperature of the ruminant to be fed, fats having fat components with a melting point lower than the body temperature of the ruminant to be fed, and mixtures thereof;
   b) hydrogenating any fat selected in step a) which has fat components with a melting point lower than the body temperature of the ruminant to be fed to raise the melting point of all fat components of the hydrogenated fat above the body temperature of said ruminant;
   c) forming, essentially in the absence of any emulsifier, a dry powder of fat particles having a maximum size of about 50 μm exclusively from fat having all fat components with a melting point higher than the body temperature of the ruminant to be fed, said fat having been selected in step a) and including any fat hydrogenated in step b).

29. The method according to claim 28 further comprising the step of mixing said fat powder with an additive whereby said fat-containing ration contains at least 5% fat.

30. The method according to claim 28 further comprising the step of mixing the fat powder with an additive whereby said fat-containing ration comprises on the order of between 5% and 25% fat.

31. The method according to claim 29 wherein said additive comprises in the range of 5% to 95% of said fat-containing ration.

32. A method of feeding ruminant animals a feed ration containing at least 5% nutritional fat without causing digestive disturbances by the method comprising the steps of:
   feeding the ruminant animals a ration containing at least 5% fat, said fat having a melting temperature higher than the body temperature of the ruminant animals to be fed and comprising particles less than approximately 50 μm in size, said ration being essentially free of emulsifiers;
   allowing said ration to be ingested by said ruminant animals and for the fat to stably pass through the rumen of said ruminant animals to be resorbed in the digestive tract following the rumen.

33. A method of supplying a fat containing ration to ruminants animals, comprising the steps of:
   a) selecting at least one available fat having nutritional value to the ruminant animal to be fed, said fat being selected from the group consisting of fats having all fat components with a melting point higher than the body temperature of the ruminant animal to be fed, fats having fat components with a melting point lower than the body temperature of the ruminant animal to be fed, and mixtures thereof;
   b) hydrogenating any fat selected in step a) which has fat components with a melting point lower than the body temperature of the ruminant animal to be fed to raise the melting point of all fat components of the hydrogenated fat above the body temperature of the ruminant animal to be fed;
   c) forming, essentially without emulsifiers, a powder of fat particles having a maximum size of about 50 μm exclusively from fat having all fat components with a melting point higher than the body temperature of the ruminant animal to be fed, said fat having been selected instep a) and including any fat hydrogenated in step b); and
   d) feeding said powder of fat particles in dry form, essentially without any emulsifier, to the ruminant animal.

* * * * *

UNITED STATES PATENT AND TRADEMARK OFFICE
CERTIFICATE OF CORRECTION

PATENT NO. : 5,215,766
DATED : June 1, 1993
INVENTOR(S) : Werner Schaub

It is certified that error appears in the above-indentified patent and that said Letters Patent is hereby corrected as shown below:

Column 13, line 63, claim 11, "125%" should read --25%--.

Signed and Sealed this

Twenty-ninth Day of March, 1994

*Attest:*

BRUCE LEHMAN

*Attesting Officer*     *Commissioner of Patents and Trademarks*